US010392299B2

(12) United States Patent
Maillet et al.

(10) Patent No.: US 10,392,299 B2
(45) Date of Patent: Aug. 27, 2019

(54) GLAZING PROVIDED WITH A THIN-LAYER STACK FOR SOLAR PROTECTION

(71) Applicant: SAINT-GOBAIN GLASS FRANCE, Courbevoie (FR)

(72) Inventors: Alexandre Maillet, Compiegne (FR); Constance Magne, Paris (FR); Rosiana Aguiar, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 194 days.

(21) Appl. No.: 15/128,490

(22) PCT Filed: Mar. 25, 2015

(86) PCT No.: PCT/FR2015/050762
§ 371 (c)(1),
(2) Date: Sep. 23, 2016

(87) PCT Pub. No.: WO2015/145073
PCT Pub. Date: Oct. 1, 2015

(65) Prior Publication Data
US 2017/0204001 A1    Jul. 20, 2017

(30) Foreign Application Priority Data
Mar. 28, 2014  (FR) ..................... 14 52688

(51) Int. Cl.
*C03C 17/34* (2006.01)
*B32B 17/10* (2006.01)
(Continued)

(52) U.S. Cl.
CPC .... *C03C 17/3435* (2013.01); *B32B 17/10128* (2013.01); *B32B 17/10174* (2013.01);
(Continued)

(58) Field of Classification Search
CPC ..... C03C 17/00–17/44; B32B 17/00–17/1099; Y10T 428/00–428/8305
See application file for complete search history.

(56) References Cited

U.S. PATENT DOCUMENTS 5,073,451 A    12/1991   Iida et al.
2002/0012779 A1*  1/2002   Miyashita .............. B01J 35/002
                                                     428/216
(Continued)

FOREIGN PATENT DOCUMENTS

| JP | 2009-502566 | 1/2009 |
| JP | 2013-503812 | 2/2013 |
| WO | 2007/028913 A1 | 3/2007 |
| WO | 2010/031808 A1 | 3/2010 |

OTHER PUBLICATIONS

Miyashita et al. "Enhanced effect of vacuum-deposited SiO2 overlayer on photo-induced hydrophilicity of TiO2 film". Journal of Materials Science 36 (2001); pp. 3877-3884.*
(Continued)

*Primary Examiner* — Prashant J Khatri
(74) *Attorney, Agent, or Firm* — Oblon, McClelland, Maier & Neustadt, L.L.P.

(57) ABSTRACT

A solar protection and/or thermal insulation glazing including a substrate, in particular a glass substrate, provided with a stack of thin layers which act on solar radiation, the stack having the succession of the following layers, starting from the surface of the glass: an underlayer or a set of underlayers, the underlayer(s) having dielectric materials, a layer based on titanium oxide also having silicon, the overall Si/Ti atomic ratio in said layer being between 0.01 and 0.25, and in which Si and Ti represent at least 90% of the atoms other than oxygen, the thickness of the layer being between 20 and 70 nm, an overlayer or a set of overlayers, said overlayer(s) having dielectric materials.

16 Claims, 1 Drawing Sheet

(51) Int. Cl.
*G02B 5/28* (2006.01)
*C03C 17/22* (2006.01)
*C03C 17/245* (2006.01)

(52) U.S. Cl.
CPC ...... *B32B 17/10339* (2013.01); *C03C 17/225* (2013.01); *C03C 17/245* (2013.01); *C03C 17/2456* (2013.01); *G02B 5/285* (2013.01); *G02B 5/286* (2013.01); *C03C 2217/212* (2013.01); *C03C 2217/23* (2013.01); *C03C 2217/281* (2013.01); *C03C 2217/91* (2013.01); *C03C 2218/156* (2013.01); *G02B 5/281* (2013.01)

(56) References Cited

U.S. PATENT DOCUMENTS

| | | |
|---|---|---|
| 2007/0108043 A1 | 5/2007 | Lu |
| 2008/0226882 A1 | 9/2008 | Belliot |
| 2009/0075069 A1* | 3/2009 | Myli .................... C03C 17/002 428/336 |
| 2012/0164443 A1 | 6/2012 | Durandeau et al. |

OTHER PUBLICATIONS

Earle, M.D. "The Electrical Conductivity of Titanium Dioxide". Physical Review, vol. 61, Issues 1-2, (1942); pp. 56-62.*
International Search Report dated Jun. 25, 2015 in PCT/FR2015/050762 filed Mar. 25, 2015.

* cited by examiner

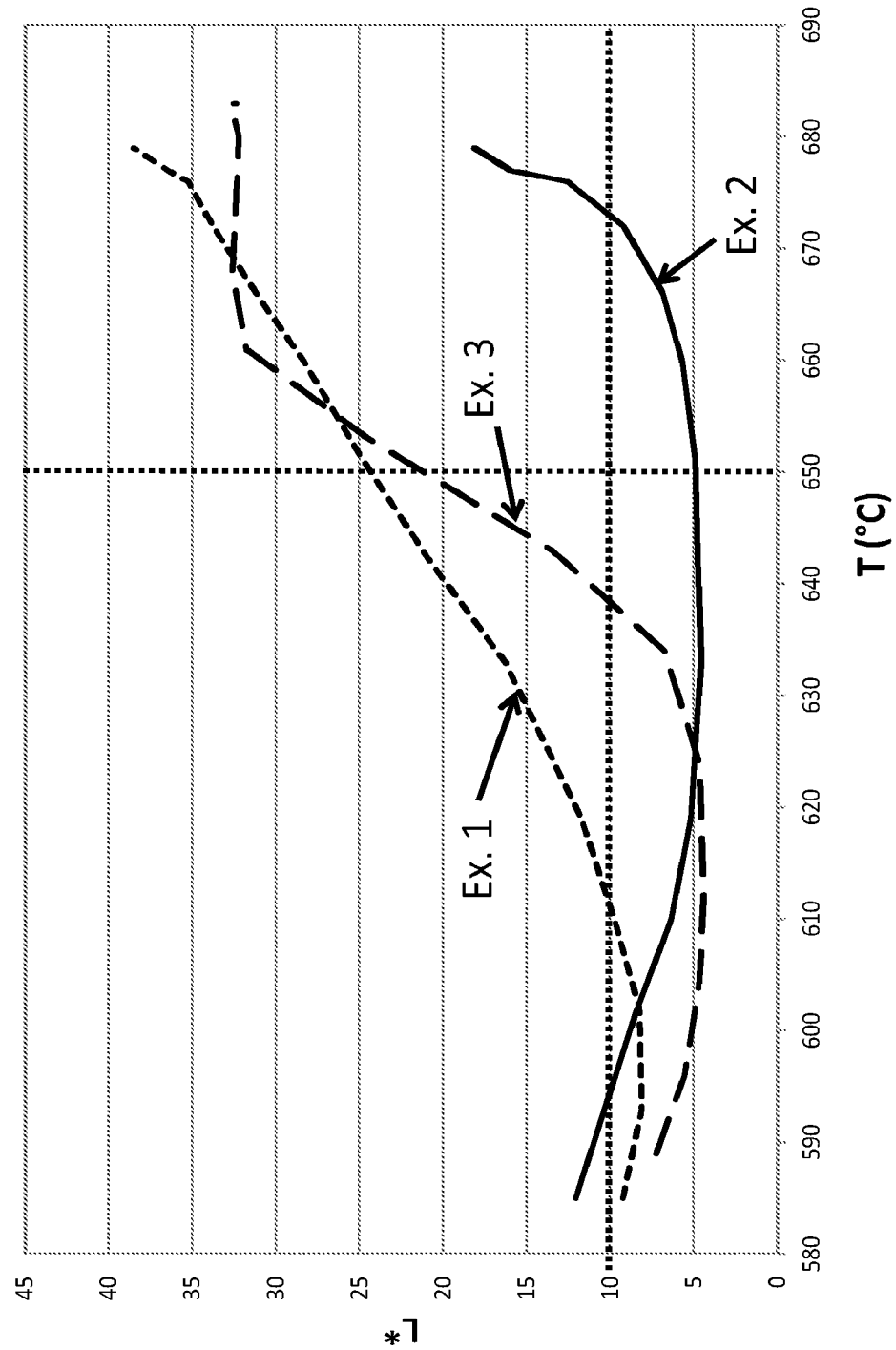

GLAZING PROVIDED WITH A THIN-LAYER STACK FOR SOLAR PROTECTION

The invention relates to glazings comprising a stack of thin layers which act on solar radiation and are intended more particularly for solar protection.

The glazing according to the invention is more particularly suitable for fitting buildings, even though it is not limited thereto and in particular it can also be used in the automobile industry, as a side window, sunroof or else rear window.

In a known manner, by selecting the chemical nature, the thicknesses and the succession of the thin layers constituting the stack, it is possible to act significantly on the amount of energy from solar radiation entering or leaving a premises or a passenger compartment. In particular, such a glazing makes it possible to prevent excessive heating inside said premises or passenger compartment in summer and thus contributes to limiting the consumption of energy required for the air-conditioning thereof.

The invention also relates to such a glazing used as a spandrel panel once opacified, so as to be part of a facade facing panel, and which makes it possible, in combination with vision glazings, to provide buildings with exterior surfaces which are entirely glazed and uniform.

These layered glazings (and spandrel panels) are subject to a certain number of constraints: with regard to glazings, the layers used must firstly sufficiently screen out solar radiation, i.e. they must allow thermal insulation while allowing, however, at least a part of the light to pass through, as measured by the light transmission $T_L$. In addition, these thermal performances must preserve the optical and esthetic appearance of the glazing: it is thus desirable to be able to modulate the level of light transmission of the substrate, while at the same time keeping a color judged to be esthetic and preferably substantially neutral, most particularly in external reflection. This is also true for spandrel panels with regard to the appearance in reflection.

According to another essential aspect, these layers must also be sufficiently durable, all the more so if, in the glazing once installed, they are on one of the exterior faces of the glazing (as opposed to the "interior" faces, turned towards the intermediate gas-filled cavity of double glazing for example).

There is another constraint which strongly arises today: when the glazings at least partially consist of glass substrates, the latter very often undergo one or more heat treatments, for example of the bending type if it is desired to give them a curved shape (shop window), or else of the tempering or annealing type if it is desired for them to be more resistant and therefore less hazardous in the event of impacts.

While depositing the layers after the heat treatment of the glass is complex and expensive, it is also known that depositing the layers on the glass before carrying out said heat treatment can cause a substantial modification of the properties, in particular optical and energy properties, of said stacks.

It is thus sought to obtain, and this is the subject of the present invention, thin-layer stacks which can be capable of withstanding heat treatments without too significantly modifying the optical/thermal properties of the glazing as a whole and without degradation of its general appearance observed before tempering. In particular, in such a case, reference will be made to "bendable" or "temperable" layers.

An example of solar protection glazing for buildings is given in patents EP-0 511 901 and EP-0 678 483: these are functional layers for screening out solar radiation which are made of nickel-chromium alloy, optionally nitrided, of stainless steel or of tantalum, and which are placed between two dielectric layers of metal oxide such as $SnO_2$, $TiO_2$ or $Ta_2O_5$. These glazings are good solar protection glazings and have satisfactory mechanical and chemical durabilities, but are not truly "bendable" or "temperable", since the layers of oxide surrounding the functional layer cannot prevent its oxidation during the bending or tempering operation, said oxidation being accompanied by a modification of the light transmission and of the appearance in general of the glazing as a whole.

Many studies have recently been carried out in order to make the layers bendable/temperable in the field of low-emissivity glazings, which instead target high light transmissions contrary to solar protection glazings. It has already been proposed to use, on top of functional layers of silver, layers of dielectric based on silicon nitride, this material being relatively inert with respect to high-temperature oxidation and proving to be capable of preserving the underlying silver layer, as is described in patent EP-0 718 250.

Other stacks of layers which act on solar radiation and which are presumed to be bendable/temperable have been described, having recourse to functional layers other than silver: patent EP-0 536 607 uses functional layers of a metal nitride, of the TiN or CrN type, with protective layers of metal or of silicon derivatives, patent EP-0 747 329 describes functional layers of nickel alloy of the NiCr type, combined with layers of silicon nitride.

Stack structures using titanium dioxide ($TiO_2$) or zirconium dioxide ($ZrO_2$) as the layer which acts mainly on solar radiation, this layer being deposited on an underlayer of silicon nitride, are known, moreover, from patent application WO 2007/028913.

Such a product has thus appeared to be relatively effective with regard to its properties of reflecting the heat from solar radiation and relatively simple and economical to deposit using the magnetically enhanced sputtering (magnetron sputtering) technique.

As described in application WO 2007/028913, the depositing of a stack of the type previously described using such a technique makes it possible to deposit stacks of layers of which the thickness can be controlled to within a nanometer, thereby enabling the desired colorimetry of the glazing to be adjusted, in particular its colorimetric neutrality. The stack thus deposited is also satisfactory from the point of view of its mechanical temperature resistance properties, in particular under heat treatment conditions around 600-630° C., characteristic of the most common tempering or bending processes. Thus, the glazing according to application WO 2007/028913, having undergone such a heat treatment, does not exhibit any notable modifications of its properties, whether in terms of energy performance levels or colorimetry. In addition, it is indicated that such a heat treatment does not cause the appearance of any optical defect, such as microcracks or pinholes within the stack.

The experiments carried out by the applicant have, however, demonstrated that at a higher temperature, i.e. when the tempering, bending or annealing heat treatment is carried out above 650° C., although the stack does not exhibit any microcrack or other defect, a haze phenomenon appears, without any particular structural modification observable within the glazing being able to explain such a phenomenon.

BRIEF DESCRIPTION OF THE SEVERAL VIEWS OF THE DRAWINGS

FIG. 1 shows the L* values measured for Examples 1, 2, and 3 as a function of the temperature gradient to which the various samples were subjected.

For the purposes of the present invention, the term "haze", measured as a percentage, is intended to mean the loss by scattering of the light, i.e., conventionally, the ratio of the scattered part of the light (diffuse fraction or $T_d$) to the light directly transmitted through the glazing ($T_L$), generally expressed as percentages. The diffuse transmission thus measures the light fraction scattered by the layers deposited at the surface of the glass substrate. The haze can conventionally be measured by spectroscopy techniques, using a spectrophotometer, the integration over the whole visible range (380-780 nm) making it possible to determine the normal transmission $T_L$ and the diffuse transmission $T_d$.

Likewise, it is possible for such glazings to be used in the construction field as spandrel glazing once at least partially or most commonly totally opacified.

Spandrel glazing, more often called spandrel in the field, can, for example, make it possible to hide construction elements such as electrical cabling, plumbing, air-conditioning or, more generally, all the structural elements of the building.

In particular, in buildings which incorporate very large glazed areas, the use of spandrel glazings is advantageous for observing the esthetics and the architectural unity of the large glazed area, which can cover virtually the entire surface area of the building.

More specifically, for such buildings, given the significant size of the glazed surface areas, the glazings used must comprise, over their entire surface area, stacks which have solar control properties that make it possible to limit the cost of air-conditioning in summer and preferably thermal insulation properties that make it possible to reduce the losses of energy given off by the building in winter. The glazings, present over virtually the entire surface area of the building, therefore cover both the parts which must offer significant light transmission (then called vision glazing) and those of which the transmission must be virtually zero (eclipsing effect) in order to hide the structural elements of the building (spandrel glazing). For this purpose, it is normal to use layers of opaque enamel to obtain such masking.

For uniform esthetics from an exterior view of the building, it is useful to retain the system of layers even in the parts coated with enamel, which results in the need to deposit the enamel on the stack of layers on at least one part, usually on the entirety, of the spandrel glazing. On these layers, the application of the layer of enamel, in particular the heat treatment required for the formation thereof, can also cause the appearance of defects. In particular, the stacks of layers normally formed by vacuum deposition of the sputtering type, less resistant than the pyrolytic layers, are as a general rule more fragile with respect to high temperatures and the depositing of the enamel frequently generates visible defects after the heat treatment. More specifically, the enamel that is usually deposited is composed of a powder containing a glass frit (the vitreous matrix) and pigments used as colorants (the frit and the pigments being based on metal oxides), and a medium, also referred to as a carrier, which allows the application of the powder to the glass and its adhesion thereto at the time of the deposit. In order to obtain the final enameled coating, it is thus necessary to bake it, and it is common for this baking operation to be carried out concomitantly with the operation of tempering/bending the glass. For further details on enamel compositions, reference may be made to patents FR-2 736 348, WO96/41773, EP-718 248, EP-712 813 and EP-636 588. Enamel, a mineral coating, is durable and adheres to glass and is therefore an ideal opacifying coating. However, as previously indicated, when the glazing is provided beforehand with thin layers, it is difficult to use since the baking of the enamel involves a high-temperature heat treatment, generally at about 650° C., or higher, for the stack of layers. At such temperatures, chemical substances resulting from the preparation for the enamel or from the enamel itself tend to diffuse in the underlying layers of the stack and chemically modify them. In order to avoid this phenomenon, application WO 2011/045412 proposes using a surface layer (i.e. a layer directly in contact with the enamel) of the stack, based on titanium oxide, on niobium oxide or on tantalum oxide, said surface layer being made more resistant through the incorporation of a metal oxide of the group Ta, Nb, Al, Zr, Hf, V, Mn, Fe, Co, Ni, Cu, Si or else Zr.

The objective of the invention is then to develop a glazing comprising a substrate of glass type bearing a stack of thin layers which act on incident solar radiation, which makes it possible to solve the problems previously set out. In particular, the glazing desired according to the invention has thermal properties suitable for the solar protection of buildings, optical colorimetry and light transmission properties which are also suitable for such a use, and also an ability to withstand heat treatments without damage, in particular enameling, i.e. without the appearance of haze, even at very high temperature, i.e. greater than or equal to 650° C.

In its most general form, the present invention relates to a solar protection glazing comprising a substrate, preferably made of glass, provided with a thin-layer stack, in which said stack consists of the succession of the following layers starting from the surface of the glass:

an underlayer or a set of underlayers, said underlayer(s) consisting of dielectric materials, a layer based on titanium oxide also comprising silicon, the overall Si/Ti atomic ratio in said layer being between 0.01 and 0.25, in which layer Si and Ti represent at least 90% of the atoms other than oxygen, preferably at least 95%, or even at least 97%, even all of the atoms other than oxygen, the physical thickness of said layer being between 20 and 70 nm, preferably between 20 and 50 nm, an overlayer or a set of overlayers, said overlayer(s) consisting of dielectric materials.

In addition to the layer based on titanium oxide, the thin-layer stack according to the present invention therefore comprises only layers consisting of dielectric materials and therefore does not comprise in particular layers of metallic nature, in particular of the type of those previously described for their infrared radiation reflection and/or absorption properties, in particular those consisting of precious metals such as Ag, Pt, Pd, Au or else Cu, nor layers made of metal nitride, of the TiN or CrN type, or else based on nickel, such as NiCr.

According to particular and preferred embodiments of the present invention which can, of course, where appropriate be combined with one another:

The dielectric materials constituting the overlayers and the underlayers are chosen from zinc oxides, silicon oxides, tin oxides, titanium oxides, zinc tin oxides, silicon and/or aluminum nitrides, and silicon and/or aluminum oxynitrides.

The overall optical thickness of the underlayer(s) is between 30 and 90 nm, more preferably 40 and 70 nm.

The overall optical thickness of the overlayer(s) is between 7 and 30 nm, more preferably between 10 and 20 nm.

The glazing comprises, between the surface of the glass and the layer of titanium oxide, two underlayers, including one layer based on silicon oxide, the physical thickness of which is preferably between 10 and 20 nm, and one layer based on silicon nitride, the physical thickness of which is preferably between 15 and 25 nm.

The glazing comprises, between the surface of the glass and the layer of titanium oxide, a single underlayer based on silicon nitride, the physical thickness of which is preferably between 15 and 35 nm.

The glazing comprises, on top of the layer of titanium oxide, the succession of an overlayer based on silicon oxide, preferably having a physical thickness of between 5 and 10 nm, and of an overlayer based on titanium oxide, preferably having a thickness of between 1 and 3 nm.

According to a first embodiment, said Si/Ti ratio is homogeneous throughout the thickness of the layer based on titanium oxide.

According to another embodiment, different than the previous one, the layer based on titanium oxide comprises a succession of strata in which the Si/Ti ratio ranges between 0 and 0.20.

The overall Si/Ti atomic ratio in the layer is between 0.05 and 0.20, more preferably is between 0.05 and 0.15.

The light transmission $T_L$ of the glazing is between 50% and 80% and more preferably between 60% and 70% and the solar factor SF is around the value of $T_L$. The term "around" is intended to mean that the difference between the two values is less than 5% and more preferably is less than 3%, or even is about 1%.

The glazing according to the invention may have undergone a heat treatment of the bending, tempering and/or annealing type.

The invention also relates to a spandrel glazing, which is at least partially opacified, and preferably totally opacified, with an additional coating, said coating being in the form of an enamel or of a lacquer. In such a spandrel glazing, the additional coating in the form of enamel or lacquer can be deposited on top of the stack of layers.

Finally, the invention relates to a multiple glazing, in particular a double glazing, incorporating a glazing as previously described.

As previously indicated, the stack of layers according to the invention can be enameled at very high temperatures, in particular about 650° C., or even higher, in the sense that it is possible to deposit the frit of the enamel on the face of the uncoated substrate or preferably on the already coated face of the stack of layers and to bake it at high temperature without substantially modifying the optical appearance of the glazing as a whole, with reference to a vision glazing provided with the same layers, in particular in external reflection. In particular, it is possible according to the invention to deposit the enamel at very high temperature without the appearance of haze on the glazing. By virtue of such advantages, it becomes possible to provide spandrel panels which offer harmonious color and great similarity, in terms of exterior appearance, with vision glazings, and thus to form entirely glazed, uniform and esthetic facades.

According to the invention, the overlayer(s) or underlayer(s) made of dielectric materials of the stack, in particular those which are based on silicon, in particular on silicon nitride or oxynitride, may also contain a metal which is minor compared with the silicon, for example aluminum, for example up to 10 mol % relative to the silicon. This is particularly useful for accelerating the depositing of the layer by reactive magnetron sputtering, where the silicon target is made more conductive by "doping" with aluminum. For the purposes of the present invention, it is thus more generally intended for the overlayers or underlayers made of dielectric materials to essentially consist of said materials, without, however, excluding that other elements, in particular other cations, are present, but in very minor amounts, in particular for the purpose of facilitating the depositing of the layers by means of the processes used, most particularly magnetron sputtering.

For the purposes of the present invention, the term "optical thicknesses" is intended to mean conventionally the product of its actual (physical) thickness multiplied by its refractive index. Thus, an optical thickness of 50 nm of $Si_3N_4$, the refractive index of which is approximately 2.0, corresponds to a deposit of 25 nanometers (physical thickness) of said material.

A subject of the invention is "monolithic" glazings (i.e. consisting of a single substrate) or insulating multiple glazings of the double glazing or even triple glazing type, at least one of the constituents (sheets) of which is a glazing according to the invention. Preferably, whether it is a question of monolithic glazings or double glazing, the stacks of layers are placed on the 2 face or on the 4 face (conventionally, the faces of the glass substrates are numbered from the exterior to the interior of the passenger compartment/of the premises fitted therewith), and thus provide an optimal protective effect against solar radiation.

Glazings on which the invention is more particularly focused have a $T_L$ of about from 50% to 80% or from 60% to 70%, and a solar factor SF of around the value of $T_L$. They also preferentially have a relatively neutral coloration with possibly a blue or green color in external reflection (on the side of the substrate not provided with layers), with in particular in the (L*, a*, b*) international colorimetry system negative a* and b* values (before and after any possible heat treatment). Thus, an attractive and not very strong color in reflection, desired in the construction industry, is obtained.

For the purposes of the present description, the optical and energy parameters according to the invention are measured according to the data reported in ISO international standard 9050 (2003).

A subject of the invention is also the layered substrate at least partially opacified with a coating of lacquer or enamel type, for the purpose of producing spandrel panels, where the opacifying coating may be in direct contact with the substrate face already coated with the stack of layers. The stack of layers may therefore be completely identical for the vision glazing and for the spandrel panel. The face of the substrate already provided with a stack of thin layers and on which it is possible to deposit, according to conventional techniques, an enamel composition without the appearance of optical defects in the stack, and with very limited optical change, and in particular without the appearance of haze, is considered in particular according to the invention to be "enamelable". This also means that the stack has satisfactory durability, without any undesirable deterioration of the layers of the stack in contact with the enamel, either while it is being baked or over time once the glazing has been fitted.

Although the application more particularly intended by the invention is glazing for buildings, it is clear that other applications can be envisioned, in particular in vehicle windows (apart from windshields, where very high light transmission is required), such as the side windows, sunroof or rear window.

The advantages of the present invention are illustrated by means of the nonlimiting examples which follow, which are according to the invention and comparative.

All of the substrates are made of 6 mm-thick clear glass of Planilux type sold by the company Saint-Gobain Glass France.

All the layers are deposited by well known magnetron sputtering techniques.

More specifically:

the titanium oxide-based layers are deposited using metallic titanium targets also comprising, according to the examples, silicon or zirconium, the targets being sprayed with a plasma under an oxidizing atmosphere for the depositing of the various titanium oxide-based layers, the silicon nitride layers are deposited using a metallic silicon target comprising 8% by weight of aluminum, sprayed in a reactive atmosphere containing nitrogen (40% Ar and 60% $N_2$ for $SiN_x$). The silicon nitride layers therefore also contain a minor amount of aluminum, the silicon oxide layers are deposited using a metallic silicon target having the same composition as the previous one, sprayed in an oxidizing reactive atmosphere.

The examples which follow were carried out in order to obtain glazings provided with stacks of which the thickness and the nature of the layers is adjusted to obtain the same energy performance level, i.e. a solar factor of 68%.

EXAMPLE 1

In this comparative example and in accordance with the teaching of prior application WO 2007/028913, a stack consisting of an underlayer of silicon nitride, a layer of titanium oxide $TiO_x$ and two overlayers of $SiO_2$ and of $TiO_x$ is deposited on the glass substrate according to the following sequence:

Glass/$SiN_x$ (30 nm)/$TiO_x$ (22 nm)/$SiO_2$ (7 nm)/$TiO_x$ (1 nm)

In this comparative example, the titanium oxide layer is deposited using a metallic target consisting only of titanium.

EXAMPLE 2

In this example according to the invention, a stack similar to that described according to example 1 is deposited on the same substrate, but the $TiO_x$ layer is replaced with a $TiO_x$-based layer, also comprising silicon. The layer is deposited using a metallic target comprising an alloy of titanium and silicon in an atomic proportion of 90/10. The thicknesses of the various constituent layers of the stack are also adjusted according to the techniques of the art so that the energy performance of the glazing thus obtained is identical to that of the glazing according to preceding example 1.

The stack deposited corresponds to the following sequence:

Glass/$SiN_x$ (23 nm)/$Ti_{0.9}Si_{0.1}O_x$ (31 nm)/$SiO_2$ (7 nm)/$TiO_x$ (1 nm)

It was verified by X-ray spectroscopy (EPMA microprobe) that the atomic proportions of titanium and silicon in the titanium oxide-based layer deposited in this way correspond substantially to those initially present in the metallic target, the Si/Ti atomic ratio measured being approximately 0.1.

EXAMPLE 3

In this comparative example, a stack of the same nature as that described according to example 1 is deposited on the same substrate, but the $TiO_x$ layer is replaced with a $TiO_x$-based layer, also comprising zirconium. The layer is deposited using a metallic target comprising an alloy of titanium and zirconium in an atomic proportion of 90/10. The thicknesses of the various constituent layers of the stack are also adjusted according to the techniques of the art so that the energy performance of the glazing thus obtained is identical to that of the glazing according to preceding example 1.

The stack deposited therefore corresponds to the following sequence:

Glass/$SiN_x$ (25 nm)/$Ti_{0.9}Zr_{0.1}O_x$ (30 nm)/$SiO_2$ (7 nm)/$TiO_x$ (1 nm)

The optical properties and the colorimetry of the various glazings thus obtained according to examples 1 to 3 are measured according to the following criteria:

transmission $T_L$: light transmission as % according to illuminant $D_{65}$, light reflection glass side: ($RL_v$) as %, $a^*(R_v)$, $b^*(R_v)$: colorimetric coordinates in external reflection according to the L*, a*, b* colorimetry system, light reflection layer side: ($RL_c$) as %, $a^*(R_c)$, $b^*(R_c)$: colorimetric coordinates in external reflection according to the L*, a*, b* colorimetry system, energy transmission: solar factor SF as % which measures the ratio of the total energy entering the premises to the incident solar energy.

TABLE 1

| EXAMPLE | TRANSMISSION | | | REFLECTION LAYER SIDE (interior) | | | | REFLECTION GLASS SIDE (exterior) | | | | ENERGY TRANSMISSION (Solar Factor) |
|---|---|---|---|---|---|---|---|---|---|---|---|---|
| | $T_L$ | a* | b | $RL_c$ | L* | $a^*_{(Rc)}$ | $b^*_{(Rc)}$ | $RL_V$ | L* | $a^*_{(Rv)}$ | $b^*_{(Rv)}$ | SF (%) |
| Example 1 | 66 | 0.0 | 2.4 | 31 | 63 | −1.8 | −3.8 | 30 | 61 | −2.8 | −3.6 | 68 |
| Example 2 | 67 | 0.0 | 2.3 | 31 | 63 | −2.0 | −3.2 | 30 | 61 | −3.1 | −2.7 | 68 |
| Example 3 | 67 | 0.1 | 1.8 | 31 | 63 | −2.0 | −2.8 | 30 | 61 | −3.0 | −2.6 | 68 |

The results reported in table 1 show that the optical, colorimetric and energy performance levels of the three examples are substantially similar.

The above stacks are then subjected to the same heat treatment as that indicated in previous application WO 2007/028913, consisting of heating at 620° C. for 10 minutes, followed by tempering.

$\Delta E^*$ is defined in the following way:

$\Delta E^* = (\Delta L^{*2} + \Delta a^{*2} + \Delta b^{*2})^{1/2}$, with $\Delta L^*$, $\Delta a^*$ and $\Delta b^*$ the difference in the measurements of L*, a* and b* before and after the heat treatment.

The ΔE* before and after heat treatment is about or close to 1% and all the glazings retain their sun protection property unchanged, as measured by the SF factor. They are also perfectly calibrated from an esthetic point of view, most particularly in external reflection, where the values of a* and b* are close to zero or slightly negative, giving a very neutral or slightly blue-green color which is accepted for glazings with high external reflection. All the values measured change very weakly under the influence of the heat treatment: the $T_L$ and SF values are preserved to within approximately 1%, the colorimetric data change very little, and there is no swing from one tint to another tint in external reflection. No optical defect of microcrack or pinhole type is observed on the three glazings.

The resistance of the stacks to heat treatments at higher temperature is then measured according to the following experimental protocol.

Lamellae of the same glazings as previously described according to examples 1 to 3 are firstly covered with a strip of enamel on top of the thin-layer stack, deposited by screen printing and consolidated by drying at 160° C.

The lamellae are then subjected to heat treatment in a gradient furnace comprising 3 different resistance zones. The settings of the 3 zones are initially adjusted in such a way that the temperature to which the lamellae are subjected ranges from one extremity to the other between 580 and 680° C.

The gradient is measured at the moment the glass exits the gradient furnace using a pyrometer which records 14 measurement points on the enamel.

After cooling, it is verified that none of the samples exhibits any optical defect of the microcrack or hole (pinhole) type. The surface of the stacks on the three samples thus appears to be even, uniform and defect-free.

The measurement of the L*, a*, b* parameters in reflection is carried out in a second step through the glass on the side of the non-covered face (i.e. glass side). The measurement is carried out using a Minolta CM-600d commercial spectrocolorimeter in D65 mode (illuminant D65). Such a measurement appears to be representative of the observation of a glazing from the exterior.

In addition, it constitutes an indirect measurement of the haze generated at the surface of the glazing, viewed from the exterior. In particular, since the layer of black enamel is a layer which absorbs light directly transmitted through the glazing, the parameter L* measured in reflection by the spectrocolorimeter at the surface of the lamella (glass side) is directly proportional to the scattering of the light generated at the level of the thin-layer stack. In other words, the greater the light fraction scattered by the glazing (in particular by the stack of layers), the greater the value of the parameter L* measured on the glass side.

The tests carried out by the applicant company showed that a measured value of L* of about 10 or more appears to be perceptible to the naked eye. In particular, above this critical haze value, the glazing loses its transparency and has an undesirable milky (translucent) appearance, all the more so the higher the L*.

The various L* values thus measured have been reported on the appended FIG. 1, as a function of the temperature gradient to which the various samples were subjected. Significant differences in the haze can be observed as a function of the nature of the titanium oxide-based layer present in the stack, and in particular of the critical heating temperature above which the glazing provided with its stack has an L* value which is too high, i.e. typically greater than 10: this temperature is 610° C. for the glazing comprising the $TiO_x$ layer only, 640° C. for the glazing comprising the $Ti_{0.9}Zr_{0.1}O_x$ layer, and 675° C. for the glazing comprising the $Ti_{0.9}Si_{0.1}O_x$ layer.

Most particularly, the data reported on the graph of FIG. 1 demonstrate that only the glazing comprising the $Ti_{0.9}Si_{0.1}O_x$ layer in the solar control stack can undergo a heat treatment of about 650° C., in particular required in a process for depositing a black enamel at the surface of the glazing. In conclusion, the solar protection glazings according to the invention are very advantageous for fitting buildings, without excluding applications in the automobile industry and any vehicles: side windows, rear window, sunroof, which can, moreover, have enameled coatings. With a stack of layers which is fixed, in particular according to the $T_L$ and energy transmission (SF) values that are desired, it is thus possible, without having to modify it, to manufacture vision glazings which are not intended to undergo heat treatments or which must be bent/tempered/annealed, and to manufacture spandrel panels in good colorimetric harmony with the vision glazings, which may be lacquered or enameled: it is thus possible to standardize the manufacture of interference layers on substrates of large size, which is a great advantage from the industrial point of view.

The invention claimed is:

1. A solar protection glazing comprising a substrate, provided with a stack of thin layers which act on solar radiation, in which said stack consists of the succession of the following layers, starting from the surface of the glass:
   an underlayer or a set of underlayers, said underlayer(s) each consisting of a dielectric material;
   a layer comprising titanium oxide and silicon and having an overall Si/Ti atomic ratio from 0.01 and 0.25, wherein Si and Ti represent at least 90% of the atoms other than oxygen, and wherein the layer has a thickness between 20 and 70 nm; and
   an overlayer or a set of overlayers, said overlayer(s) each consisting of a dielectric material,
   wherein the dielectric material constituting the underlayers is at least one selected from the group consisting of a zinc oxide, a silicon oxide, a tin oxide, a zinc tin oxide, a silicon nitride, an aluminum nitride, a silicon aluminum nitride, a silicon oxynitride, an aluminum oxynitride, and a silicon aluminum oxynitride, and
   wherein the dielectric material constituting the overlayers is at least one selected from the group consisting of a zinc oxide, a silicon oxide, a tin oxide, a zinc tin oxide, a silicon nitride, an aluminum nitride, a silicon aluminum nitride, a silicon oxynitride, an aluminum oxynitride, and a silicon aluminum oxynitride or a titanium oxide having formula $TiO_x$.

2. The solar protection glazing of claim 1, comprising an overlayer of titanium oxide having formula $TiO_x$.

3. The solar protection glazing of claim 1, wherein the overall optical thickness of the underlayer(s) is between 30 and 90 nm.

4. The solar protection glazing of claim 1, wherein the overall optical thickness of the overlayer(s) is between 7 and 30 nm.

5. The solar protection glazing of claim 1, comprising, between the surface of the glass and the layer of titanium oxide, two underlayers, including one layer based on silicon oxide and one layer based on silicon nitride.

6. The solar protection glazing of claim 1, comprising, between the surface of the glass and the layer of titanium oxide, a single underlayer based on silicon nitride.

7. The solar protection glazing of claim 1, comprising, on top of the layer comprising titanium oxide, a succession of a first overlayer, which is a layer of silicon oxide, and a second overlayer, which is a layer of titanium oxide having formula $TiO_x$, in this order from the substrate.

8. The solar protection glazing of claim 1, wherein the Si/Ti ratio is homogeneous throughout the thickness of the layer based on titanium oxide.

9. The solar protection glazing of claim 1, wherein the layer comprising titanium oxide comprises a succession of strata in which the Si/Ti ratio ranges between 0 and 0.20.

10. The solar protection glazing of claim 1, wherein the overall Si/Ti atomic ratio in the layer is between 0.05 and 0.20.

11. The solar protection glazing of claim 1, wherein the light transmission $T_L$ is between 50% and 80%, and has a solar factor SF that is less than 5% different from the value of $T_L$.

12. The solar protection glazing of claim 1, wherein it has undergone a bending heat treatment, a tempering heat treatment, and/or an annealing heat treatment.

13. The solar protection glazing of claim 1, comprising an overlayer of a zinc oxide, a silicon oxide, a tin oxide, a zinc tin oxide, a silicon nitride, an aluminum nitride, a silicon aluminum nitride, a silicon oxynitride, an aluminum oxynitride, or a silicon aluminum oxynitride.

14. A spandrel glazing, comprising the solar protection glazing of claim 1, which is at least partially opacified with an additional coating, which is in the form of an enamel or in the form of a lacquer.

15. The spandrel glazing of claim 14, wherein the additional coating is deposited on top of the stack of layers.

16. A multiple glazing, comprising the solar protection glazing of claim 1.

* * * * *